United States Patent
Li et al.

(10) Patent No.: US 9,714,317 B2
(45) Date of Patent: Jul. 25, 2017

(54) ADHESIVE COMPOSITION FOR TEMPORARILY BONDING USE IN WAFER MANUFACTURING

(71) Applicants: Henkel AG & Co. KGaA, Duesseldorf (DE); Henkel IP & Holding GmbH, Duesseldorf (DE)

(72) Inventors: Leo Li, Shanghai (CN); Shabbir Attarwala, Simsbury, CT (US)

(73) Assignees: Henkel IP & Holding GmbH, Duesseldorf (DE); Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/309,915

(22) Filed: Jun. 20, 2014

(65) Prior Publication Data

US 2014/0303286 A1  Oct. 9, 2014

Related U.S. Application Data

(63) Continuation of application No. PCT/CN2012/087801, filed on Dec. 28, 2012.

(30) Foreign Application Priority Data

Dec. 30, 2011  (CN) .......................... 2011 1 0459522

(51) Int. Cl.
| | |
|---|---|
| *C09J 163/00* | (2006.01) |
| *C08G 59/56* | (2006.01) |
| *C08G 59/66* | (2006.01) |
| *C08G 59/50* | (2006.01) |
| *C08G 59/40* | (2006.01) |

(52) U.S. Cl.
CPC ......... *C08G 59/50* (2013.01); *C08G 59/4064* (2013.01)

(58) Field of Classification Search
USPC .......................... 523/402, 403, 404, 427, 428
See application file for complete search history.

(56) References Cited

U.S. PATENT DOCUMENTS

| | | | | |
|---|---|---|---|---|
| 3,567,677 A * | 3/1971 | Webb | .................. | C08G 59/22 |
| | | | | 523/429 |
| 3,929,717 A * | 12/1975 | Lee | ..................... | C08G 59/226 |
| | | | | 525/113 |
| 4,092,293 A * | 5/1978 | Harris | .................. | C08G 59/66 |
| | | | | 525/523 |
| 4,284,574 A * | 8/1981 | Bagga | .................. | C07D 303/24 |
| | | | | 549/555 |
| 4,897,141 A | 1/1990 | Girard | | |
| 6,153,302 A | 11/2000 | Karim et al. | | |
| 6,313,257 B1 * | 11/2001 | Abbey | ..................... | C08F 8/34 |
| | | | | 252/182.17 |
| 6,562,482 B1 * | 5/2003 | Sakamoto | ............ | C08G 59/628 |
| | | | | 257/789 |
| 2011/0130479 A1 | 6/2011 | Kramer et al. | | |
| 2013/0255879 A1* | 10/2013 | Bieber | ................. | C08G 59/182 |
| | | | | 156/330 |

FOREIGN PATENT DOCUMENTS

| | | | | |
|---|---|---|---|---|
| CN | 102120918 A | | 7/2011 | |
| GB | 705098 A * | | 3/1954 | .............. C08L 63/00 |
| WO | WO 2012/087546 A1 * | | 6/2012 | .............. C08G 59/18 |

OTHER PUBLICATIONS

Technical Data Sheet for Versamine EH 30 (no date).*
International Search Report for PCT/CN2012/08791, 2 pages.

* cited by examiner

*Primary Examiner* — Michael J Feely
(74) *Attorney, Agent, or Firm* — Steven C. Bauman

(57) ABSTRACT

The present invention relates to a temporarily bonded adhesive composition used in wafer manufacturing, to the production method and use thereof. The adhesive composition comprises a component A and a component B, wherein the component A comprises an epoxy resin; and the component B comprises a thiol, an amine and a water soluble polymer.

15 Claims, No Drawings

ADHESIVE COMPOSITION FOR TEMPORARILY BONDING USE IN WAFER MANUFACTURING

TECHNICAL FIELD

The present invention relates to an adhesive composition for temporarily bonding use in wafer manufacturing, to production method and use thereof.

BACKGROUND ART

In wafer manufacturing industry, silicon ingot is required to be sliced into wafers. Conventionally, silicon ingot is bonded and fixed on a support by using an adhesive, and then the silicon ingot is sliced into wafers. Accordingly, as for the adhesive composition used for wafer manufacturing, on one hand, the bonding between the silicon ingot and/or the sliced wafer and support should be sufficiently strong so as not to cause bonding failure; on the other hand, there is a need for the adhesive to be removed from the wafer after the slicing of the silicon ingot has completed. In other words, such an adhesive composition is temporarily bonded.

U.S. Pat. No. 4,897,141A discloses a process of preparing semiconductor wafers from ingots by bonding said ingots to a cutting beam with an epoxy adhesive and slicing the ingot into wafers, said process comprising the steps of: a. mixing hollow microspheres with the resin part of an epoxy adhesive, wherein the hollow microspheres are formed from silicate glass melts, etc.; b. mixing a hardener for the epoxy adhesive with the mixture of step a.; c. coating the mixed adhesive system on said cutting beam and/or semiconductor; d. contacting the cutting beam with a silicon ingot; e. allowing the adhesive to cure; f. slicing the ingot into wafers; and g. recovering the wafers by breaking the adhesive bond between the semiconductor wafer and the cutting means.

JP9157628 discloses a temporarily bonding adhesive, which comprises one or more of rosin resin or modified rosin resin, and its preparation method is to mix the rosin resin or modified rosin resin with dibasic acid or styrene-acrylic acid copolymer, and to dissolve the resulting mixture in an aqueous alkali solution at pH 7.5-14. The adhesive is used by uniformly coating the wafer therewith, volatilizing water or other volatile components in the adhesive by baking, then heating the resulting wafer at a temperature higher than the softening point of the resin, allowing the prepared wafer to temporarily bond, and then cooling it down. The resulting adhesive is peeled with a knife, etc., after the wafer is processed.

JP7224270 describes a temporarily bonding adhesive which comprises a fatty acid ester of polyglycerine, an adduct of polyglycerine with ethylene oxide and an adduct of polyglycerine with a propylene oxide as active ingredients of the adhesive. In addition, the adhesive is difficult to dissolve in cold water, but is easy to dissolve in hot water. Consequently, after application, the adhesive is removed by using hot water.

While the above temporarily bonding adhesives for silicon ingot slicing are present in the prior art, there are still needs for a temporarily bonding adhesive combining better bonding effect and ease of demounting.

SUMMARY OF INVENTION

On one aspect, the present invention provides an adhesive composition, comprising a component A and a component B, characterized in that the component A comprises an epoxy resin, and the component B comprises a thiol, an amine and a water-soluble polymer.

In an embodiment of the present invention, the water-soluble polymer is dispersed in component B in molecule level.

In another embodiment of the present invention, the epoxy resin is selected from the group consisting of biphenol A type epoxy resins, biphenol F type epoxy resins and combination thereof.

In yet another embodiment of the present invention, based on the total weight of the adhesive composition, the amount of the epoxy resin is about 25 wt. %-about 40 wt. %, and preferably about 30 wt. %-about 35 wt. %.

In yet another embodiment of the present invention, the thiol is a multifunctional polythiol.

In yet another embodiment of the present invention, based on the total weight of the adhesive composition, the amount of the thiol is about 20 wt. %-about 30 wt. %, and preferably about 21.5 wt. %-about 27.5 wt. %.

In yet another embodiment of the present invention, the amine is selected from the group consisting of N-aminoethylpiperazine, N,N-dimethylbenzylamine, 2,4,6-tri(dimethylaminomethyl)phenol and combination thereof.

In yet another embodiment of the present invention, based on the total weight of the adhesive composition, the amount of the amine is about 1.5 wt. %-about 4 wt. %, and preferably about 2.5 wt. %-about 3 wt. %.

In yet another embodiment of the present invention, the water-soluble polymer is selected from the group consisting of polyvinylpyrrolidone (PVP), polyvinyl acetate (PVA) and combination thereof.

In yet another embodiment of the present invention, based on the total weight of the adhesive composition, the amount of the water-soluble polymer is about 1 wt. %-about 3 wt. %, and preferably about 2 wt. %.

In yet another embodiment of the present invention, at least one of the component A and the component B further comprises a filler.

In yet another embodiment of the present invention, the filler is selected from the group consisting of alumina, silica, calcium carbonate and combination thereof.

In yet another embodiment of the present invention, based on the total weight of the adhesive composition, the amount of the filler is about 15 wt. %-about 50 wt. %, and preferably about 25 wt. %-about 40 wt. %.

On another aspect, the present invention also provides a method for producing an adhesive composition. In one embodiment, the method comprises steps of: (1) homogeneously mixing an epoxy resin and optionally a filler to produce a component A; (2) dissolving a water-soluble polymer in a thiol, so that the water-soluble polymer is dispersed in the thiol in molecule level, and a premix is then formed; subsequently, homogeneously mixing the premix with an amine and optionally a filler to produce a component B; and (3) mixing the component A and the component B to produce an adhesive composition.

In addition, the present invention also relates to the use of an adhesive composition in the slicing of a silicone ingot.

DETAILED DESCRIPTION OF EMBODIMENTS

Unless otherwise defined, all technical and scientific terms used herein have the same meaning as commonly understood by one of ordinary skill in the art to which this invention belongs. In case of conflict, the present specification, including definitions, will control.

When an amount, concentration, or other value or parameter is given as either a range, a preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used to describe a value or an end-point of a range, the disclosure should be understood to include the specific value or end-point involved.

Unless stated otherwise, all percentages, parts, ratios, etc., are by weight.

All of the materials, methods and examples are exemplified, unless stated otherwise, they should be understood as non-limited.

The invention is described in detail hereinafter.

According to one aspect, the present invention provides an adhesive composition, comprising a component A and a component B, characterized in that the component A comprises an epoxy resin, and the component B comprises a thiol, an amine and a water-soluble polymer.

In a preferred embodiment of the present invention, the water-soluble polymer is dispersed in the component B in molecule level.

In the present invention, the expression "dispersed in molecule level" has the ordinary meaning known to a person skilled in the art. Particularly, it means that the water-soluble polymer in the present invention is dispersed in a premix and the component B obtained therefrom in approximately molecule level or molecule level, and the premix and the component B obtained therefrom are clear and have no visible particles.

Epoxy Resin

In the context of the present invention, the term "epoxy resin" means a polymer including an epoxy group in the molecule structure. The cured epoxy resin has good physical and chemical properties, and it possesses excellent bonding strength to the surface of metal and non-metal materials, high hardness, good flexibility, and stability to alkalis and most of solvents.

The epoxy resin suitable for the present invention includes aromatic glycidyl epoxy resins and aliphatic epoxy resins, e.g. biphenol type and phenol novolac type of epoxy resins, and other bifunctional and monofunctional epoxy resins having epoxy group, epoxy diluents or combination thereof. More particularly, it can be biphenol A type epoxy resins, biphenol S type epoxy resins, biphenol F type epoxy resins, phenol novolac epoxy resins, cresol novolac epoxy resins, epoxy diluents and combination thereof, and biphenol A type epoxy resins, biphenol F type epoxy resins and combination thereof are preferred.

The epoxy resin used in the present invention may be commercially available, e.g. the epoxy resins of EPON 828 and EPON 862 from Momentive New Materials; and DER 331 from DOW Chemicals.

In the adhesive composition of the present invention, the amount of the epoxy resin, based on the total weight of the adhesive composition, is about 25 wt. %-about 40 wt. %, and preferably about 30 wt. %-about 35 wt. %.

Thiol

In the present invention, the thiol broadly means a compound having R—SH structure, in which R is alkyl group. The thiol suitable for the present invention includes multifunctional polythiol and multifunctional monomeric thiol, and multifunctional polythiol is particularly preferred.

The multifunctional monomeric thiol suitable for the present invention includes, but not limited thereto, difunctional monomeric thiol, trifunctional monomeric thiol and multifunctional monomeric thiol.

The difunctional monomeric thiol suitable for the present invention includes, but not limited thereto, diethylene glycol dimercaptopropionate, 4-t-butyl-1,2-benzenedithiol, bis-(2-mercaptoethyl)sulfide, 4,4'-thiodibenzenethiol, benzenedithiol, ethylene glycol dimercaptoacetate, ethylene glycol dimercaptopropionate-1,2-ethylene (3-mercaptopropionate), polyethylene glycol dimercaptoacetate, polyethylene glycol di(3-mercaptopropionate), 2,2-bis(mercaptomethyl)-1,3-propanedithiol, 2,5-dimercaptomethyl-1,4-dithiane, bisphenofluorene bis(ethoxy-3-mercaptopropionate), 4,8-bis(mercaptomethyl)-3,6,9-tithia-1,11-undecanedithiol, 2-mercaptomethyl-2-methyl-1,3-propanedithiol, 1,8-dimercapto-3,6-dioxaoctane, and thioglycerol bismercaptoacetate.

The trifunctional monomeric thiol suitable for the present invention includes, but not limited thereto, trimethylolpropane (trismercaptopropionate), trimethylolpropane tris(3-mercaptoacetate), tris-(3-mercaptopropyl)isocyanurate, 1,2,3-trimercaptopropane, and tris(3-mercaptopropionate) triethyl-1,3,5-triazine-2,4,6-(1H,3H,5H)-trione.

The multifunctional monomeric thiol suitable for the present invention includes, but not limited thereto, poly (mercaptopropyl methyl) siloxane, 4-mercaptomethyl-3,6-dithia-1,8-octanedithiolpentaerythritol tetrakis (3-mercaptoacetate) and pentaerythritol tetrakis (3-mercaptopropionate).

The polythiol suitable for the present invention may contain one or more mercapto group(s), and has the following structure:

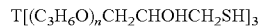

wherein, T is trihydric alcohol, e.g. trimethylol propanol or glycerol.

Alternatively, the polythiols may be those having a polyester, polyurethane, polyacrylate or polyether as backbone.

The polythiol used in the present invention may be commercially available, e.g. the Capcure 3800 from Cognis Chemicals.

In the adhesive composition of the present invention, the amount of the thiol, based on the total weight of the adhesive composition, is about 20 wt. %-about 30 wt. %, and preferably about 21.5 wt. %-about 27.5 wt. %.

Amine

The amine mentioned in the present invention broadly means a compound having a N—H group. The amine may be selected from polyamines, tertiary amines and combination thereof.

The polyamines may be selected from the group consisting of aliphatic polyamines, arylaliphatic polyamines, cycloaliphatic polyamines, aromatic polyamines, heterocyclic polyamines, polyalkoxy polyamines, dicyandiamide and derivatives thereof, aminoamides, imide, ketimines and combination thereof.

In the present invention, tertiary amine is particularly preferred, and is selected from the group consisting of triethylamine, tributylamine, N-ethyl-diisopropylamine, N,N,N',N'-tetramethyl-ethylenediamine, pentamethyl-diethylenetriamine and higher grade homologues thereof, N,N,N',N'-tetramethyl-propylenediamine, pentamethyldipropylenetriamine and higher grade homologues thereof, N,N,N',N'-tetramethyl-1,3-butylenediamine, N,N,N',N'- tetramethyl-1,6-hexylenediamine, bis-(dimethylamino)-methane, N,N-dimethylbenzylamine, N,N-dimethylcyclohexylamine, N-methyl-dicyclohexylamine, N,N-dimethyl-hexadecylamine, bis-(N,N-diethylaminoethyl)-adipate, N,N-dimethyl-2-phenylethylamine, tri-(3-dimethylaminopropyl)amine, 1,4-diazabicyclo[2,2,2]octane, 1,8-diazabicyclo[5,4,0]undec-7-ene, 1,5-diazabicyclo[4,3,0]nonyl-5-ene, N-methylmorpholine, N-ethylmorpholine, N-cocoylmorpholine, N-aminoethylpiperazine, N,N'-dimethylpiperazine, N-methyl-N'-dimethylaminoethyl-piperazine, bis-(dimethylaminoethyl)-piperazine, 1,3,5-tri-(dimethylaminopropyl)-hexahydrotriazine, bis-(2-dimethylaminoethyl)-ether, and 2,4,6-tri(dimethylaminomethyl)phenol, or combination thereof; and N-aminoethylpiperazine, N,N'-dimethylpiperazine, and 2,4,6-tri(dimethylaminomethyl)phenol are preferred.

The amine used in the present invention may be commercially available, e.g. Ancamine K 54 and Ancamine AEP from Air Products.

In the adhesive composition of the present invention, the amount of the amine, based on the total weight of the adhesive composition, is 1.5 wt. %-4 wt. %, and preferably about 2.5 wt. %-about 3 wt. %.

Water-Soluble Polymer

The water-soluble polymer suitable for the present invention is selected from polyvinylpyrrolidone, polyvinyl acetate and combination thereof, and polyvinylpyrrolidone is preferred.

The water-soluble polymer used in the present invention may be commercially available, e.g. the polyvinylpyrrolidone product of PVP K 30 from BASF.

In the adhesive composition of the present invention, the amount of the water-soluble polymer, based on the total weight of the adhesive composition, is about 1 wt. %-about 3 wt. %, and preferably about 2 wt. %.

Filler

The adhesive composition of the present invention may contain a filler selected from alumina, silica, calcium carbonate and combination thereof. In a preferred embodiment, the adhesive composition of the present invention preferably contains silica as the filler, and its mesh number should be larger than about 600 meshes, preferably about 1,250-about 3,000 meshes, so as to prevent the particle size of the filler from negatively affecting the thickness of bonding layer of the adhesive.

In the adhesive composition of the present invention, the amount of the filler, based on the total weight of the adhesive composition, is about 15 wt. %-about 50 wt. %, and preferably about 25-about 40 wt. %.

Preparation Method

On another aspect, the present invention provides a method for preparing an adhesive composition. In one embodiment, the method comprises steps of:

(1) homogeneously mixing an epoxy resin and optionally a filler to produce a component A;

(2) dissolving a water-soluble polymer in a thiol, so that the water-soluble polymer is dispersed in the thiol in molecule level, and then a premix is formed; subsequently, homogeneously mixing the premix and an amine and optionally a filler to produce a component B; and (3) mixing the component A and the component B to produce an adhesive composition, wherein step (2) is preferably performed with heating and stirring, and the temperature is about 40° C.-about 70° C.

In the premix obtained from step (2), by means of visible observation via human eyes, the resulting liquid is colorless and clear, and has no partulate matters.

The Application of the Adhesive Composition

The adhesive composition can be used in the process and methods in which temporarily bonding is needed, e.g. the slicing of wafer and the slicing of sapphire used for light emitting diodes.

EXAMPLES

Preparation of Adhesive

The adhesive compositions described in the present invention were prepared following the above-mentioned preparation method. The starting materials of the components of the adhesive composition were shown below:

TABLE 1

| Component A: | |
|---|---|
| Epoxy resin | Epon 828, Momentive |
| | Epon 862, Momentive |
| | Heloxy modifier 62, Momentive |
| | Heloxy modifier 68, Momentive |
| | Heloxy modifier 48, Momentive |
| Filler | Silica, B-666, CNPC Powder; |
| | Silica, Aerosil R 202, Degussa; |
| Component B: | |
| Thiol | Capcure 3800, Cognis Chemicals; |
| | TMPMP, Japan CBC; |
| Amine | Ancamine K 54, Air Products; |
| | Ancamine AEP, Air Products; |
| Filler | Silica, B-666, CNPC Powder; |
| | Silica, Aerosil R 202, Degussa; |
| | Calcium carbonate, Shanghai Perfection Nanometre New Material; |
| | Polyvinylpyrrolidone, PVP K 30, BASF; |

Example 1

| | (wt. %) |
|---|---|
| Component A | |
| Biphenol A epoxy resin (Epon 828) | 26.5 |
| Silica (B-666) | 22.5 |
| Fumed silica (Aerosil R 202) | 1 |
| Component B | |
| Thiol (Capcure 3800) | 21.5 |
| Amine (Ancamine AEP) | 2.5 |
| Polyvinylpyrrolidone (PVP K 30) | 2 |
| Silica (B-666) | 23 |
| Fumed silica (Aerosil R 202) | 1 |
| Total | 100 |

Example 2

| | (wt. %) |
|---|---|
| Component A | |
| Biphenol A epoxy resin (Epon 828) | 40 |
| Silica (B-666) | 9 |
| Fumed silica (Aerosil R 202) | 1 |
| Component B | |
| Thiol (Capcure 3800) | 30 |
| Amine (Ancamine AEP) | 3 |

-continued

| | (wt. %) |
|---|---|
| Polyvinylpyrrolidone (PVP K 30) | 2 |
| Silica (B-666) | 14 |
| Fumed silica (Aerosil R 202) | 1 |
| Total | 100 |

Example 3

| | (wt. %) |
|---|---|
| Component A | |
| Biphenol A epoxy resin (Epon 828) | 35 |
| Calcium carbonate (Shanghai Perfection Nanometre) | 14 |
| Fumed silica (Aerosil R 202) | 1 |
| Component B | |
| Thiol (Capcure 3800) | 25 |
| Amine (Ancamine AEP) | 2.5 |
| Polyvinylpyrrolidone (PVP K 30) | 2 |
| Calcium carbonate (Shanghai Perfection Nanometre) | 19.5 |
| Fumed silica (Aerosil R 202) | 1 |
| Total | 100 |

Example 4

| | (wt. %) |
|---|---|
| Component A | |
| Biphenol F epoxy resin (Epon 862) | 37.5 |
| Silica (B-666) | 11.5 |
| Fumed silica (Aerosil R 202) | 1 |
| Component B | |
| Thiol (Capcure 3800) | 30 |
| Amine (Ancamine AEP) | 3 |
| Polyvinylpyrrolidone (PVP K 30) | 2 |
| Silica (B-666) | 14 |
| Fumed silica (Aerosil R 202) | 1 |
| Total | 100 |

Example 5

| | (wt. %) |
|---|---|
| Component A | |
| Biphenol A epoxy resin (Epon 828) | 32.5 |
| Epoxy active diluent (Heloxy modifier 62) | 2.5 |
| Silica (B-666) | 14 |
| Fumed silica (Aerosil R 202) | 1 |
| Component B | |
| Thiol (Capcure 3800) | 27.5 |
| Amine (Ancamine AEP) | 2.75 |
| Polyvinylpyrrolidone (PVP K 30) | 2 |
| Silica (B-666) | 16.75 |
| Fumed silica (Aerosil R 202) | 1 |
| Total | 100 |

Example 6

| | (wt. %) |
|---|---|
| Component A | |
| Biphenol A epoxy resin (Epon 828) | 30.5 |
| Epoxy active diluent (Heloxy modifier 48) | 2.5 |
| Silica (B-666) | 16 |
| Fumed silica (Aerosil R 202) | 1 |
| Component B | |
| Thiol (Capture 3800) | 27.5 |
| Amine (Ancamine AEP) | 2.75 |
| Polyvinylpyrrolidone (PVP K 30) | 2 |
| Silica (B-666) | 16.75 |
| Fumed silica (Aerosil R 202) | 1 |
| Total | 100 |

Example 7

| | (wt. %) |
|---|---|
| Component A | |
| Biphenol A epoxy resin (Epon 828) | 29 |
| Epoxy active diluent (Heloxy modifier 48) | 2.5 |
| Silica (B-666) | 17.5 |
| Fumed silica (Aerosil R 202) | 1 |
| Component B | |
| Thiol (Capcure 3800) | 27.5 |
| Amine (Ancamine AEP) | 2.75 |
| Polyvinylpyrrolidone (PVP K 30) | 2 |
| Silica (B-666) | 16.75 |
| Fumed silica (Aerosil R 202) | 1 |
| Total | 100 |

Example 8

| | (wt. %) |
|---|---|
| Component A | |
| Biphenol F epoxy resin (Epon 862) | 32.5 |
| DEN 438 (phenol novolac epoxy resin) | 5 |
| Silica (B-666) | 11.5 |
| Fumed silica (Aerosil R 202) | 1 |
| Component B | |
| Thiol (Capcure 3800) | 30 |
| Amine (Ancamine AEP) | 3 |
| Polyvinylpyrrolidone (PVP K 30) | 2 |
| Silica (B-666) | 14 |
| Fumed silica (Aerosil R 202) | 1 |
| Total | 100 |

Example 9

| | (wt. %) |
|---|---|
| Component A | |
| Biphenol F epoxy resin (Epon 862) | 26.5 |
| Silica (B-666) | 22.5 |
| Fumed silica (Aerosil R 202) | 1 |

-continued

| Component B | (wt. %) |
|---|---|
| Thiol (Capcure 3800) | 12.5 |
| Thiol (TMPMP) | 7.5 |
| Amine (Ancamine K 54) | 2.5 |
| Polyvinylpyrrolidone (PVP K 30) | 2 |
| Silica (B-666) | 24.5 |
| Fumed silica (Aerosil R 202) | 1 |
| Total | 100 |

Example 10

| Component A | (wt. %) |
|---|---|
| Biphenol A epoxy resin (Tianyuan 618) | 25 |
| Silica (B-666) | 24 |
| Fumed silica (Aerosil R 202) | 1 |
| Component B | |
| Thiol (Capcure 3800) | 21.5 |
| Amine (Ancamine AEP) | 2.5 |
| Polyvinylpyrrolidone (PVP K 30) | 2 |
| Silica (B-666) | 23 |
| Fumed silica (Aerosil R 202) | 1 |
| Total | 100 |

Property Measurements

The properties of the adhesive compositions of present invention were measured combined with conventional wafer slicing process as below.

The adhesives were obtained by homogenously mixing the component A and the component B in equal weight ratio, and then the adhesives were automatically applied onto the surface of a silicon ingot by a dispenser or manually applied by a scraper knife. Before the application, it should be confirmed that the surface to be bonded is clean and free of grease.

1. Coating Thickness of the Applied Adhesive

The coating thickness of applied adhesive in the present invention was small, so as to allow the used amount significantly decreased in the case of large-area operation. In order to control the coating thickness, firstly the particle size of each solid filler in the adhesive was assured to be less than about 0.2 mm, and then the coating thickness was controlled by the self-weight of silicon ingot or additional loading.

2. Operation Time

A component A and a component B were homogenously mixed in equal weight ratio and thus a total weight of 50 g of specimen was obtained. Stirring was performed and the time recording started. When the specimen was sufficiently mixed, a piece of bamboo stick was inserted into the adhesive and then it was pulled out. The above operation was repeated until the adhesive was cured, which means when the bamboo stick was pulled out, there was no adhesive adhered to. Recorded the time immediately and this time period was referred as the operation time or gluing time.

3. Demounting

A conventional wafer slicing process was used in the measurement of the present invention, which included the steps of
  a. applying the adhesive composition onto a silicon ingot;
  b. bonding the silicon ingot with a support, such as a glass substrate, and curing for a certain period of time;
  c. slicing the bonded silicon ingot by a slicing machine for about 6-10 hours;
  d. after slicing, washing the wafers by warm water;
  e. after washing, charging the wafers hanging on the glass substrate into hot water for demounting, and the temperature range of the hot water was about 55° C.-about 80° C.

After the wafers were dipped into a hot water tank for a certain period of time, the wafers automatically demounted from the support, such as a glass substrate. If the surface of the wafer was clean without remaining glue threads, the demounting was regarded as good. If the demounting time was within the range of about 4-15 minutes, the adhesive was regarded as easily demountable.

4. Measurement of Bonding Strength and Hardness

Generally, standard measurement sheets were used to measure the bonding strength and hardness and determine whether the requirements of silicon ingot slicing were achieved. The measurement of the bonding strength was conventionally conducted by a universal tensile machine, and its measuring standard was applied in according to ASTM: D1002. The measuring standard of hardness was applied in according to ASTM: D2240. Generally, the hardness should reached Shore-D 75 or more.

5. Yield Evaluation of Wafer

Conventionally, each silicon ingot was cut to about 1000 pieces of wafers. The yield of wafer is the most important factor in the manufacturing process. The major factors taking an effect on the yield included:
  a. wafer dropping or breaking occurring in the cutting process, which are largely influenced by the bonding strength and hardness of the adhesive;
  b. wafer dropping or breaking occurring when high pressure water was used to wash the wafers after the cutting was completed, which were also largely influenced by the bonding strength and hardness of the adhesive;
  c. wafer breaking occurring in the subsequent process of demounting, the wafers were dipped into the hot water so as to automatically demount the wafers. In this regard, the bonding strength, hardness and thickness of the adhesive were major factors.

The wafers without dropping or breaking during cutting, washing and demounting are the passed products, and the yield is calculated by dividing the number of resulting passed products to the total number of wafers.

Results of the Measurements and Evaluations

The results of each property of the present adhesives were given in Table 2.

TABLE 2

| | Example 1 | Example 2 | Example 3 | Example 4 | Example 5 |
|---|---|---|---|---|---|
| Operation time/min | 15 | 15 | 15 | 15 | 15 |
| Shearing strength/MPa | 15.2 | 16.5 | 20.1 | 16.4 | 12.8 |
| Hardness (Shore-D) | 82 | 78 | 78 | 80 | 77 |

TABLE 2-continued

|  |  |  |  |  |  |
|---|---|---|---|---|---|
| Coating thickness/mm | 0.23 | 0.26 | 0.21 | 0.24 | 0.24 |
| Yield of wafers/ | 95.3 | 96.5 | 96.2 | 98.0 | 95.1 |
| Demounting | easy to demount; no residue | easy to demount; no residue | easy to demount; no residue | easy to demount; no residue | easy to demount; no residue |

|  | Example 6 | Example 7 | Example 8 | Example 9 | Example 10 |
|---|---|---|---|---|---|
| Operation time/min | 15 | 15 | 15 | 10 | 15 |
| Shearing strength/MPa | 15.9 | 16.8 | 17.1 | 19.7 | 16.4 |
| Hardness (Shore-D) | 80 | 80 | 82 | 81 | 82 |
| Coating thickness/mm | 0.25 | 0.24 | 0.26 | 0.25 | 0.28 |
| Yield of wafers/ | 96.8 | 96.7 | 95.5 | 95.8 | 97.1 |
| Demounting | easy to demount; no residue | Easy to demount; no residue | easy to demount; no residue | easy to demount; no residue | easy to demount; no residue |

As indicated in above table 2, the present adhesives were good in hardness and shearing strength. The hardness of the present adhesives after curing under room temperature for about 6 hours was about Shore-D 77, which met the requirements of silicon slicing for the hardness of adhesive layer. The strength of the present adhesives after curing under room temperature for about 6 hours was about 11 MPa. Such a shearing strength was sufficient to meet the requirement of silicon machine slicing for the shearing strength.

Meanwhile, the wafers which were applied by the adhesive composition of present invention and cut were very high in yield (95.1%-98.0%). In addition, the thickness of the applied adhesive layer was controlled in a small range (0.21 mm-0.28 mm). Consequently, the use amount of the adhesive was significantly decreased, and thus the cost was reduced as well. In addition, the present adhesive showed the advantages of the ease to demount and less residues in the process of demounting.

Moreover, the operation time for current commercial adhesives was generally within about 5 minutes, and such a short operation time restricted the application of the adhesives in large-scale manufacturing. Surprisingly, the present adhesives possessed longer operation time (except for about 10 minutes in Example 8, about 15 minutes in other examples), and thus the waste of adhesive was significantly reduced and the present adhesive exhibited significant advantages in large-scale application operation.

What is claimed is:

1. A two part adhesive composition, comprising a first component A and a second component B, wherein component A comprises an epoxy resin in an amount of 25 wt. %-40 wt. % based on the total weight of the adhesive composition, and the component B comprises a thiol in an amount of 20 wt. %-30 wt. %, an amine in an amount of 1.5 wt. %-4 wt. % and a water-soluble polymer in an amount of 1 wt. %-3 wt. %, each based on the total weight of the adhesive composition, wherein after the adhesive composition is cured between substrates and when the cured adhesive composition is exposed to water in a temperature range of about 55° C. to 80° C. the substrates demount from the cured adhesive.

2. The adhesive composition according to claim 1, in which the epoxy resin is selected from the group consisting of bisphenol A type epoxy resins, bisphenol S type epoxy resins, bisphenol F type epoxy resins, phenol novolac epoxy resins, cresol novolac epoxy resins, epoxy diluents and combination thereof.

3. The adhesive composition according to claim 1, in which the epoxy resin is selected from the group consisting of bisphenol A type epoxy resins, bisphenol F type epoxy resins and combination thereof.

4. The adhesive composition according to claim 1, in which the thiol is selected from the group consisting of multifunctional polythiols, difunctional monomeric thiols, trifunctional monomeric thiols, multifunctional monomeric thiols and combination thereof.

5. The adhesive composition according to claim 1, in which the thiol is one or more selected from the group consisting of diethylene glycol dimercaptopropionate, 4-t-butyl-1,2-benzenedithiol, bis-(2-mercaptoethyl) sulfide, 4,4'-thiodibenzenethiol, benzenedithiol, ethylene glycol dimercaptoacetate, ethylene glycol dimercaptopropionate-1, 2-ethylene (3-mercaptopropionate), polyethylene glycol dimercaptoacetate, polyethylene glycol di(3-mercaptopropionate), 2,2-bis(mercaptomethyl)-1,3-propanedithiol, 2,5-dimercaptomethyl-1,4-dithiane, bisphenofluorene bis(ethoxy-3-mercaptopropionate), 4,8-bis(mercaptomethyl)-3,6,9-trithia-1,11-undecanedithiol, 2-mercaptomethyl-2-methyl-1, 3-propanedithiol, 1,8-dimercapto-3,6-dioxaoctane, and thioglycerol bismercapto-acetate, trimethylolpropane (tris-mercaptopropionate), trimethylolpropane tris(3-mercaptoacetate), tris(3-mercaptopropyl)isocyanurate, 1,2,3-trimercaptopropane, and tris(3-mercaptopropionate)triethyl-1,3, 5-triazine-2,4,6-(1H,3H,5H)-trione, poly(mercaptopropyl methyl) siloxane, 4-mercaptomethyl-3,6-dithia-1,8-octanedithiolpentaerythritol tetrakis (3-mercaptoacetate), and pentaerythritol tetrakis (3-mercapto-propionate), polythiols having a polyester as a backbone, polythiols having a polyurethane as a backbone, polythiols having a polyacrylate as a backbone and polythiols having a polyether as a backbone.

6. The adhesive composition according to claim 1, in which the amine is selected from the group consisting of polyamines, tertiary amines and combination thereof.

7. The adhesive composition according to claim 1, in which the amine is selected from the group consisting of aliphatic polyamines, arylaliphatic polyamines, cycloaliphatic polyamines, aromatic polyamines, heterocyclic polyamines, polyalkoxy polyamines, dicyandiamide and derivatives thereof, aminoamides, imide, ketimines, triethylamine, tributylamine, N-ethyl-diisopropylamine, N,N,N', N'-tetramethyl-ethylenediamine, pentamethyl-diethylenetriamine and higher grade homologues thereof, N,N,N',N'-tetramethyl-propylenediamine, pentamethyldipropylenetriamine and higher grade homologues thereof, N,N,N',N'-tetramethyl-1,3-butylenediamine, N,N,N',N'-tetramethyl-1,6-hexylenediamine, bis-(dimethylamino)-methane, N,N-dimethylbenzylamine, N,N-dimethyl-cyclohexylamine, N-methyl-dicyclohexylamine, N,N- dimethyl-hexadecylamine, bis-(N,N-diethylaminoethyl)-adipate, N,N-dimethyl-2-phenylethylamine, tri-(3-dimethylaminopropyl)amine, 1,4-diazabicyclo[2,2,2]octane, 1,8-diazabicyclo[5,4,0]undec-7-ene, 1,5-diazabicyclo[4,3,0]nonyl-5-ene, N-methylmorpholine, N-ethylmorpholine, N-cocoylmorpholine, N-aminoethyl-piperazine, N,N'-dimethylpiperazine, N-methyl-N'-dimethylaminoethyl-piperazine, bis-(dimethylaminoethyl)-piperazine, 1,3,5-tri-(dimethylaminopropyl)-hexahydrotriazine, or bis-(2-dimethylaminoethyl)-ether and 2,4,6-tri(dimethylaminomethyl)phenol.

8. The adhesive composition according to claim 1, in which the amine is selected from the group consisting of N-aminoethylpiperazine, N,N-dimethylbenzyiamine, 2,4,6-tri (dimethylaminomethyl)phenol and combination thereof.

9. The adhesive composition according to claim 1, in which the water-soluble polymer is selected from the group consisting of polyvinylpyrrolidone, polyvinyl acetate and combination thereof.

10. The adhesive composition according to claim 1, in which at least one of the first component A and the second component B further comprises a filler.

11. The adhesive composition according to claim 10, in which based on the total weight of the adhesive composition, the amount of the filler is 15 wt. %-50 wt. %.

12. A method for producing the two part adhesive composition according to claim 1, comprising steps of:
   (1) producing the first component A by homogeneously mixing the epoxy resin;
   (2) producing the second component B by forming a premix and homogeneously mixing the premix with the amine, wherein the premix is formed by dissolving the water-soluble polymer in the thiol, so that the water-soluble polymer is dispersed in the thiol.

13. An adhesive composition produced by performing the method according to claim 12 and mixing the first component A and the second component B.

14. A method of bonding together two or more substrates with the adhesive composition according to claim 1, and thereafter demounting the bonded substrates, comprising the steps of:
   applying the adhesive composition onto a first substrate;
   mating a second substrate to the adhesive composition—applied first substrate and permitting the adhesive composition to cure between the first substrate and the second substrate thereby forming a bonded assembly;
   slicing the bonded assembly to form sliced portions of the bonded assembly;
   exposing the sliced portions of the bonded assembly to water in a temperature range of from about 55° C. to about 80° C. to demount the sliced first substrate from the sliced second substrate of the sliced portions of the bonded assembly.

15. The process according to claim 14, wherein the first substrate is a silicon ingot and the second substrate is a support.

* * * * *

UNITED STATES PATENT AND TRADEMARK OFFICE
CERTIFICATE OF CORRECTION

PATENT NO. : 9,714,317 B2
APPLICATION NO. : 14/309915
DATED : July 25, 2017
INVENTOR(S) : Leo Li and Shabbir Attarwala Page 1 of 1

It is certified that error appears in the above-identified patent and that said Letters Patent is hereby corrected as shown below:

In the Specification

Column 4, Line 17: Change "tithia" to -- trithia --.

Column 8, Line 11 (Example 6): Change "Capture" to -- Capcure --.

Signed and Sealed this
Twenty-second Day of May, 2018

Andrei Iancu
*Director of the United States Patent and Trademark Office*